July 5, 1966
R. A. OLSEN
3,259,351
LOADING BALANCER ASSEMBLY
Filed March 8, 1965
7 Sheets-Sheet 1
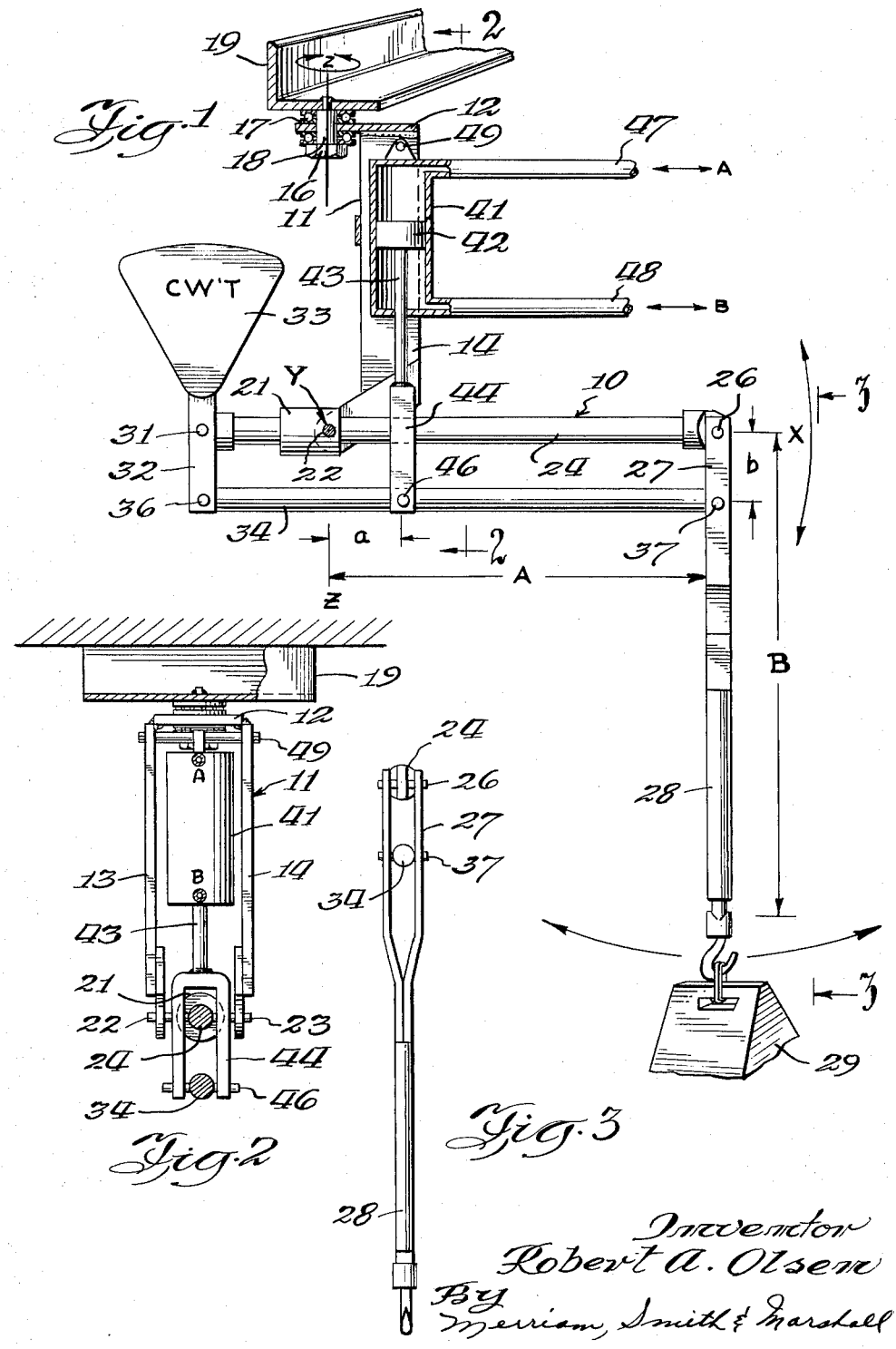

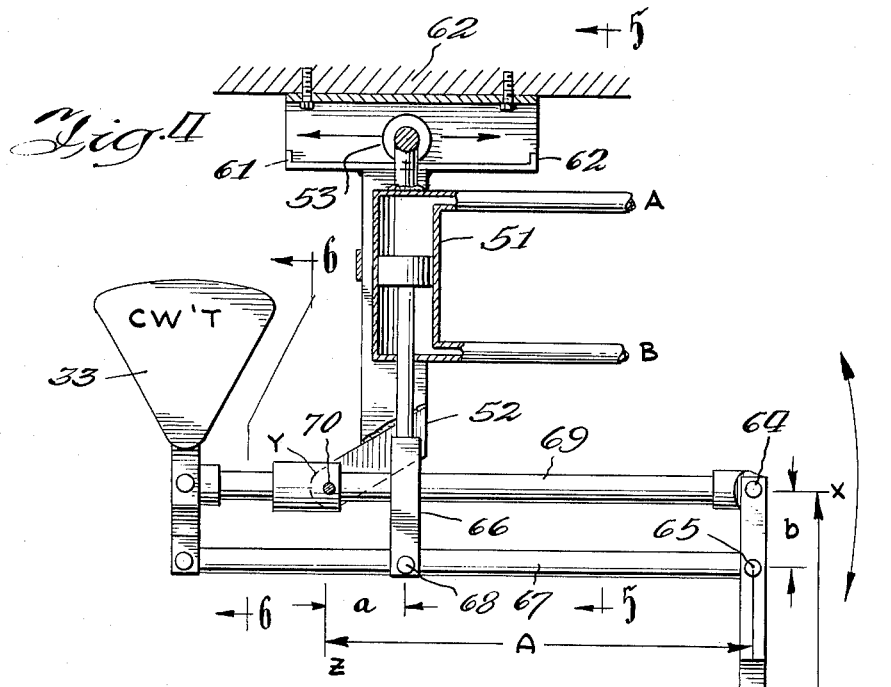
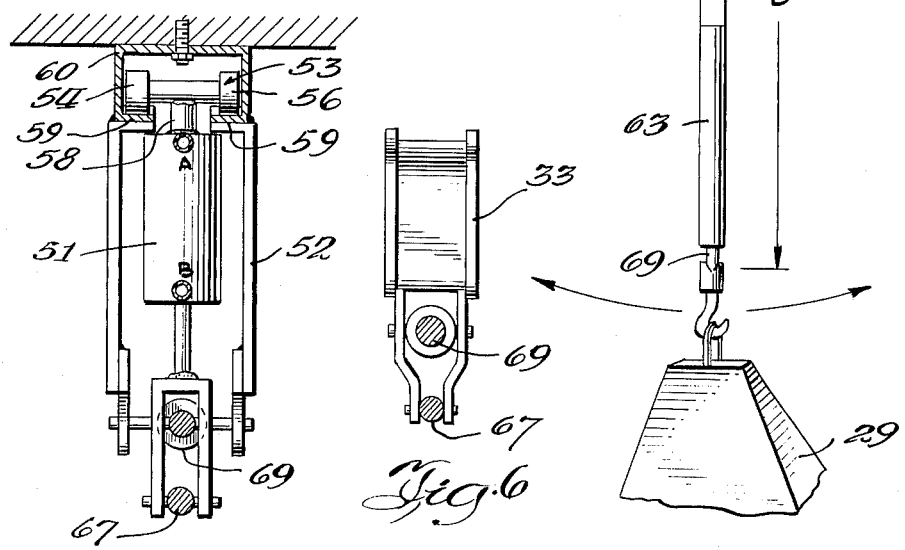

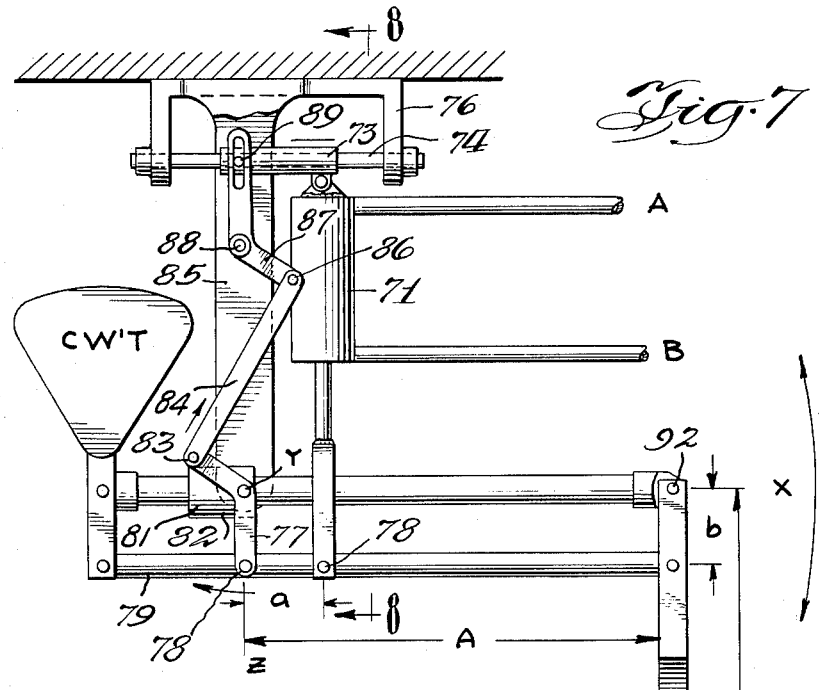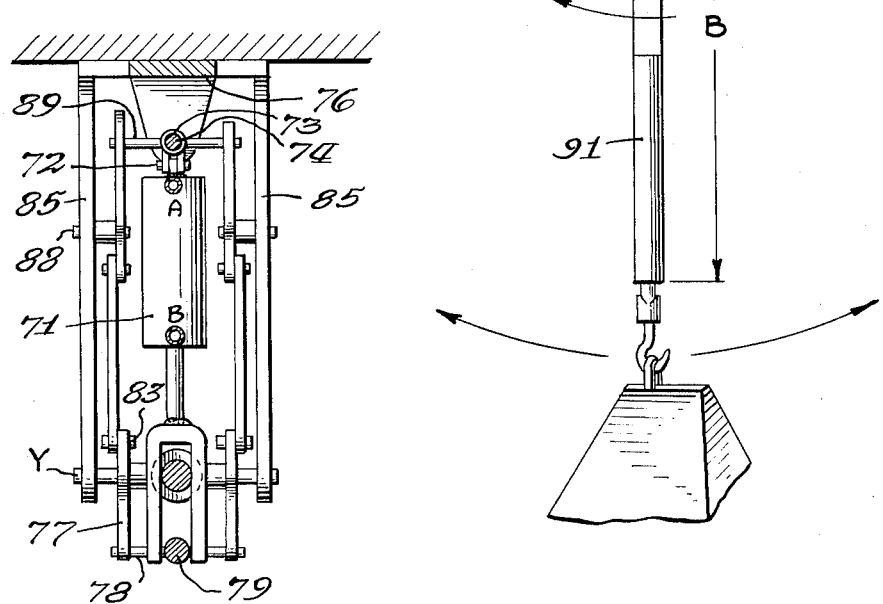

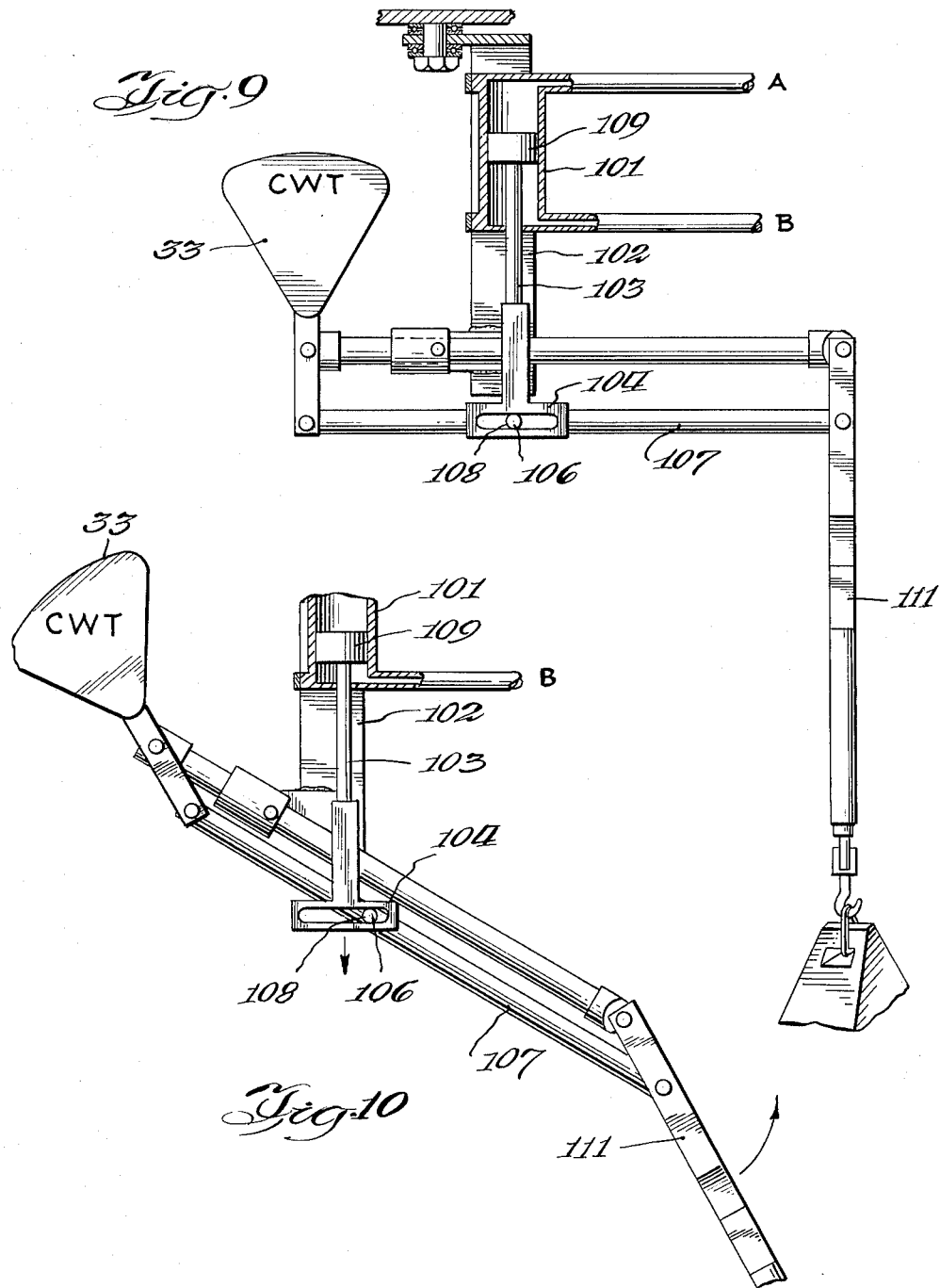

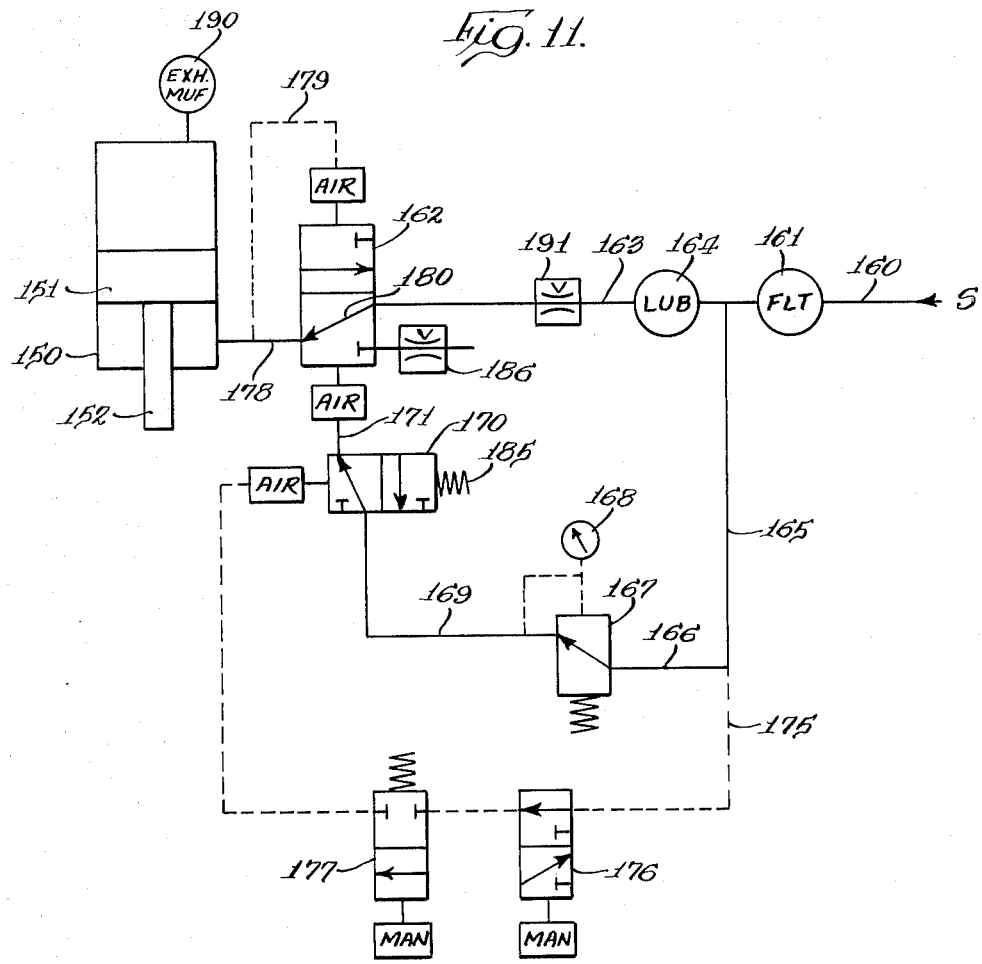

July 5, 1966  R. A. OLSEN  3,259,351
LOADING BALANCER ASSEMBLY
Filed March 8, 1965  7 Sheets-Sheet 6

United States Patent Office 3,259,351
Patented July 5, 1966

3,259,351
LOADING BALANCER ASSEMBLY
Robert A. Olsen, Palatine, Ill., assignor to Conco Engineering Works, Inc., a corporation of Illinois
Filed Mar. 8, 1965, Ser. No. 444,890
15 Claims. (Cl. 248—325)

This application is a continuation-in-part of Robert A. Olsen application Serial No. 428,282, filed January 14, 1965, now abandoned, which is a continuation-in-part of application Serial No. 356,401, filed April 1, 1964, now abandoned.

This invention relates to load handling equipment and, more particularly, to a hoisting, positioning, and balancing apparatus for the repetitive handling of work pieces, power tools, and the like.

In U.S. Patent No. 3,134,340, which was issued on May 26, 1964, to Robert A. Olsen and Milton R. Nielsen, there is described a positioning apparatus which permits exact balancing of a load about three axes and which permits the load to be moved as desired with a slight, constant effort and positioned at any point within the effective coverage of the apparatus. The apparatus incorporates an assembly of four arms, pivotally connected and arranged to form a parallelogram, and a counterweight which is used to balance exactly a load attached to one of the arms. By suitable selection of the lengths of the arms of the parallelogram as well as the effective weight of the counterweight, the apparatus can be made to balance perfectly about each of three axes, thereby permitting effective movement of the load in any desired direction with merely the force required to overcome friction in the apparatus.

In one of the embodiments of the apparatus disclosed in the Olsen et al. patent, the apparatus is arranged to permit two operating modes, one in which no load is present and in which the apparatus is balanced for its own weight only, and another in which the apparatus is balanced to support a given load. Conversion from one mode of operation to the other is accomplished by moving a portion of the counterweight between two fixed positions, thereby varying the balancing force exerted by the counterweight. This embodiment permits effective hoisting and depositing of a work load in addition to balancing the load as desired within the effective range of the apparatus.

Although the "loading" embodiment disclosed in the Olsen et al. patent is effective and satisfactory for many applications, it has been found to have some shortcomings when the nature of the work in which the balancer is used requires a high speed transfer from one mode of operation to the other. In such instances, the attempt to make this conversion by rapid shifting of the counterweight gives rise to undesirable inertial forces which are reflected back to the operator of the machine, particularly when the weights involved are substantial in size, and thereby limit the maximum rate at which loading and unloading can be carried out.

The present invention constitutes an improvement on the balancer apparatus disclosed in the Olsen et al. patent which permits rapid transfer between the loaded and unloaded modes of operation without undesirable inertial effects. The transfer is accomplished by supplying an additional force to one arm of the four-arm balancer assembly to compensate for the load which is added or removed and thereby to maintain an existing balanced condition. The force is applied by means having relatively little mass, such as a fluid-actuated piston and cylinder, so that no substantial inertial effects are encountered in changing modes.

The invention will be better understood from the following detailed description thereof, taken in conjunction with the accompanying drawings, in which the same numbers are used to indicate like elements in the several views, and in which:

FIGURE 1 is a side view, partly broken away for the sake of clarity, of one version of the positioning apparatus of the present invention, showing the use of a pneumatic cylinder for supplying a balance-restoring force;

FIGURE 2 is a sectional view along the line 2—2 of FIGURE 1 showing the positioning of the pneumatic cylinder within the arms of the hanger holding the balancer assembly in FIGURE 1;

FIGURE 3 is an end view of the apparatus of FIGURE 1 along the line 3—3 showing the yoke arrangement used to attach the load-supporting arm to the rest of the assembly;

FIGURE 4 is another embodiment of the invention in which the point of support of the top of the pneumatic cylinder is movable horizontally, so that the cylinder always exerts its force in a vertical direction, thereby permitting more perfect balancing under varying conditions;

FIGURE 5 is a sectional view along the line 5—5 of FIGURE 4 showing the roller assembly used to support the upper end of the pneumatic cylinder;

FIGURE 6 is a sectional view along the line 6—6 of FIGURE 4 showing the yoke assembly used to support the counterweight;

FIGURE 7 is another embodiment of the invention in which a vertical position of the pneumatic cylinder is maintained by means of an arrangement of bell cranks;

FIGURE 8 is a sectional view along the line 8—8 of FIGURE 7;

FIGURE 9 is another embodiment of the invention in which the pneumatic cylinder always applies a vertical force even when the apparatus is moved to a position such that the counterweight-supporting and load-supporting arms are not vertical;

FIGURE 10 shows the apparatus of FIGURE 9 moved to an extreme position, illustrating the manner in which the cylinder continues to provide a vertical force;

FIGURE 11 is a schematic of a suitable pneumatic circuit for setting and maintaining a constant pressure;

Figure 12:
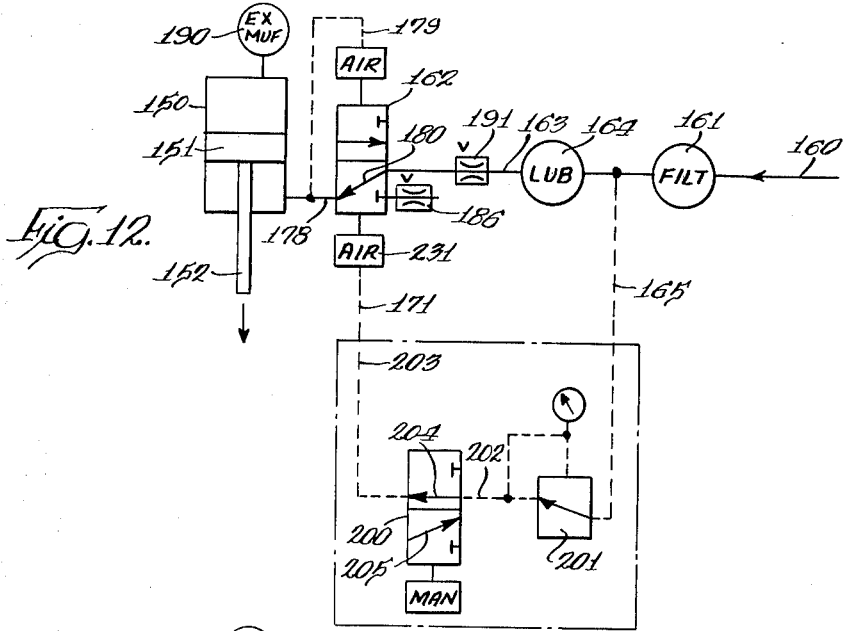
FIGURE 12 is a schematic of a simplified circuit for setting and maintaining a constant pressure.

Referring to FIGURE 1, in a typical embodiment the apparatus of the invention comprises a balancer assembly 10 supported by means of hanger assembly 11 which comprises base plate 12 and side pieces 13 and 14. Hanger assembly 11 is, in turn, supported by king pin 16 (provided with bearings 17 and 18) from channel 19 which, in turn, is supported in any suitable manner, not shown. The king pin and bearing assembly permits the apparatus to rotate about the line Z—Z so as to permit positioning as desired.

Pivot bearing 21 is pivotally supported between the arms 13 and 14 of hanger assembly 11 by means of trunnions 22 and 23. Pivot bearing 21, in turn, supports arm 24, one end of which is pivotally connected by pin 26 to yoke 27 which forms a part of the load-supporting arm 28 for carrying load 29. At its other end, arm 24 is pivotally connected by means of pin 31 to yoke 32 (similar to the yoke shown in FIGURE 6) at the upper end of which is attached counterweight 33. Yoke 32 is pivotally connected at its lower end to arm 34 by means of pin 36, the other end of arm 34 being pivotally connected to yoke 27 by means of pin 37.

The portion of the present invention as described up to this point is precisely identical to that disclosed in the Olsen et al. patent referred to above. As described in this patent, the lengths of arms 10 and 34 and of yokes 32 and 27 between the pivotal connections therein are such that a parallelogram is formed. By suitable selection of the weight of counterweight 33 and the length of the lever arm connecting this counterweight to the parallelogram assembly (i.e., the length of yoke 32 above pin 31), as well as the relative lengths of the portions of arm 24 on either side of pivot bearing 21, the structure can be made to balance precisely any desired load attached to load-supporting arm 28, which load will then be in balance for any position to which the balancer is moved.

It will be seen, however, that if the apparatus is adjusted so as to balance any desired load, it will obviously be unbalanced when the load is removed. In order to permit balancing in both modes of operation, i.e., both with and without a load on arm 28, and further, without necessitating the shifting of portions of counterweight 33, which gives rise to undesirable inertial effects, the apparatus of the present invention provides means for supplying a generally vertical force to arm 34, the force being of the proper direction and size to counteract the unbalance created when load 29 is removed (assuming that the apparatus is originally balanced in the loaded condition) or added (assuming that the apparatus is originally balanced in the unloaded mode). The vertical force is suitably provided by a fluid-actuated cylinder assembly 41 comprising piston 42, reciprocable therein, which is connected by means of connecting rod 43 and yoke 44 to arm 34, the connection being by means of pin 46. Conduits 47 and 48 are connected to opposite ends of cylinder 41, permitting the introduction of a fluid under pressure to either the top or bottom side of piston 42 in order to create a downward or upward force, respectively. Conduits 47 and 48 lead to a conventional hydraulic or pneumatic source and regulator, which form no part of the invention per se. The top of cylinder 41 is supported by means of anchor pin 49 which is attached to the sides 13 and 14 of hanger 11.

With the apparatus in the position shown in FIGURE 1, i.e., with both load-supporting arm 28 and yoke 32 supporting counterweight 33 in a balanced vertical position, it will be seen that the removal or addition of load 29 can be compensated for by a suitable force exerted by piston 42 through connecting arm 43 and yoke 44 to arm 34 in a direction to re-establish a balanced condition in the apparatus. For example, if it is desired to use the force exerted by the cylinder to compensate for the removal of the load, the apparatus is adjusted to achieve a balanced condition with the load attached and no force exerted by the cylinder. In this condition, both of conduits 47 and 48 are open to atmosphere, so that no force is applied on either side of piston 42, and the piston is then free to assume any position within the cylinder as required by movement of the apparatus. In order to disengage the load, cylinder 41 is activated by means of a suitable control, not shown, to cause a fluid under pressure to enter the cylinder and exert a force on the upper side of piston 42 which, in turn, produces a downward force on arm 34 tending to cause a net clockwise rotation of the entire apparatus about the horizontal axis through trunnions 22 and 23. Provided that load 29 is in contact with a suitable rest, the downward force necessary to balance the counteracting moment created by counterweight 33 is now supplied by the piston 42 rather than the weight of load 29. Accordingly, the load can be disengaged from load-supporting arm 28 and the apparatus will, nevertheless, remain in balance. It will be obvious to those skilled in the art that for balance after the load is removed, the force required to be exerted by piston 42 is such that this force times the moment arm $a$ (i.e., the perpendicular distance from the axis of trunnions 22 and 23 to the pin 46) is equal to the moment produced by the weight of load 29 acting through its moment arm, i.e., the distance A.

As an alternative, it may be desired to maintain the balance of the assembly in the unloaded condition, so that no force is applied by piston 42 when there is no load on arm 28. When it is desired to hoist a load, fluid under pressure is introduced below piston 42, creating a net upward force on arm 34 which counteracts the downward moment created by the load, thereby again achieving a balanced condition in the apparatus.

The apparatus shown in FIGURE 1, in which the upper end of cylinder 41 is fixed relative to hanger 11, is such that, with the fluid pressure in cylinder 41 being constant, perfect balance can be maintained only when the structural elements have the position shown, i.e., with both the load-supporting arm 28 and counterweight-supporting yoke 32 in precisely vertical position. Under these circumstances, with piston 42 also exerting a precisely vertical force, a balanced condition can be achieved and maintained. However, if the force exerted by the piston remains constant and arm 28, for example, is moved to a non-vertical position, the balanced condition is destroyed, since, although counterweight 33 and the load 29 continue to provide constant vertical forces resulting from the attraction of gravity, the force supplied by piston 42 becomes increasingly removed from vertical. It is, therefore, true that unless the structural configuration of the apparatus is such that piston 44 can exert its force constantly in a precisely vertical direction, the apparatus can be balanced precisely only for vertical positions of arm 28 and yoke 32 and that, for all other positions, the balance is approximate only. This discrepancy can be minimized by making the effective length between the point of support at the top of cylinder 41 (i.e., pin 49) and the effective point of connection with arm 34 (i.e., pin 46), relatively long. It will be obvious that the longer this distance, the less the displacement from vertical resulting from a given angular rotation of arm 28 about pin 26. The practical effect of this imbalance, of course, varies with different conditions and is dependent on the actual lengths of the members, the sizes of the weights involved, and the desired limit on the amount of force required to move the apparatus in an unbalanced condition.

The embodiments of the invention shown in FIGURES 4, 7 and 9 depict modifications of the apparatus which permit the force exerted by the cylinder to be applied always in a vertical direction, even as the load and counterweight arms are moved away from vertical. In this way, exact balance can be maintained throughout the movement of the apparatus within its effective area of operation.

In the embodiment of FIGURE 4, the upper end of cylinder 51 is not fixed horizontally relative to hanger 52 which supports the assembly. Instead, cylinder 51 is connected at its upper end by rod 58 to a roller assembly 53 consisting of opposed rollers 54 and 56 which are rotatably affixed to axle 57 connected by rod 58 to the upper end of the cylinder. Rollers 54 and 56 roll on inwardly extending flanges 59 (provided with end stops 61 and 62) connected to channel 60 which, in turn, is shown as fastened to any suitable overhead support. The remainder of the apparatus in FIGURE 4 is identical with that shown in FIGURE 1.

In the operation of the embodiment of FIGURE 4, it will be seen that, with the load-support arm 63 in a vertical position as shown, the apparatus corresponds precisely to that of FIGURE 1. When arm 63 is rotated, for example, in a counterclockwise manner about pin 64, the point of connection of yoke 66 to arm 67 (i.e., pin 68) will move to the right and that there will be transmitted to roller assembly 53 a resultant force tending to displace the roller assembly to the right. The roller assembly will, accordingly, roll along flanges 59 to a new position in which the roller is directly above the now-displaced position of pin 68 so that the net force exerted by cylinder 51 remains in a vertical position.

It can be shown that, provided the force of the cylinder is always applied vertically, an exactly balanced position of the assembly can be maintained if the ratio of distance A (the length of arm 69 between pins 70 and 64) to distance $a$ (the perpendicular distance between pin 70 and pin 68), i.e., $A/a$, is equal to the ratio of $B/b$, where B is the effective length of the load-supporting arm 63 between pin 64 and pin 68 and $b$ is the distance between pins 64 and 65.

FIGURE 7 shows another embodiment of the invention which is adapted so that the cylinder always maintains a vertical position resulting in a balanced condition of the assembly regardless of the movement of the load. In this embodiment, cylinder 71 is connected by means of pin 72 to sleeve 73 which is slidable on rod 74 which is, in turn, supported by the arms of yoke 76. Bell crank 77 is pivotally connected by pin 78 to arm 79 and is also rotatable about trunnion 81 on pivot bearing 82. The other end of bell crank 77 is pivotally connected by pin 83 to rod 84 which is, in turn, pivotally connected about pin 86 to one end of bell crank 87. Bell crank 87 is rotatable about pin 88 supported by the opposed arms of hanger 85. The other end of bell crank 87 is provided with an elongated slot which engages pin 89 connected to sleeve 73. It will be apparent that rotation of load-support arm 91 about pin 92 will cause movement of sleeve 73 in a direction such that cylinder 71 remains in a vertical position. Under these conditions, the apparatus will remain in a balanced condition for all positions of the load-support arm 91, provided, as before, that the ratio $a/A$ is equal to ratio $b/B$.

In the embodiments of FIGURES 4 and 7, the lower point of attachment of the cylinder assembly to the balancer assembly, e.g., pin 68 in FIGURE 4, is fixed at a given point along the length of the lower arm in the balancer assembly, and the upper end of the cylinder is free to move horizontally as necessary in order to maintain the cylinder in a vertical position. In the embodiment of FIGURE 9, this relationship is reversed, so that the upper end of the cylinder remains in a fixed position relative to the hanger supporting the balancer assembly while the lower point of attachment to the balancer assembly is permitted to move horizontally so that the effective force created by the cylinder is applied in a vertical direction. In FIGURE 9, cylinder 101, which is rigidly attached to hanger 102 so as to remain always in a vertical position, applies a force through connecting rod 103 and inverted T-shaped member 104, the crosspiece of which is provided with an elongated slot which engages roller 106 which is rotatably mounted on arm 107 by means of pin 108. Roller 106 is free to move within the slot in the cross piece of member 104 so as to permit the cylinder 101 with its associated piston 109 to exert a force which is always vertical regardless of the position of the load. As illustrated in FIGURE 10, which illustrates an extreme position of load-support arm 111, the force exerted by the piston and cylinder remains in a vertical direction for all positions of the load. Accordingly, a balanced position of the entire assembly can be maintained without any tendency to become unbalanced which can result from changing the direction of the balancing force exerted by the cylinder.

An example of a fluid control circuit for the force applying piston and cylinder is shown in FIGURE 11. In this figure, a cylinder 150 has a piston 151 and a rod 152. This structure corresponds to any one of the piston and cylinder constructions shown in the mechanical embodiments contained herein, as for example, the cylinder 41 in FIGURE 1, the cylinder 51 in FIGURE 4, the cylinder 71 in FIGURE 7 and the cylinder 101 in FIGURE 9. The circuit is illustrated by conventional JIC (Joint Industry Conference) hydraulic symbols. Although either air or oil is suitable, the description of a pneumatic circuit is given.

An air supply line 160 is connected to a suitable source of pressure and a filter 161 is located in the line. A pressure regulating cylinder 162, in the form of a three-way spool valve, is connected to the line 160 by means of a line 163 having a lubricator 164. A line 165 branches off the supply line 160 and connects with a line 166 leading to a manually adjustable pressure setting valve 167 having a pressure indicating gauge 168. The outlet side of the valve 167 is connected by a line 169 to a pilot actuated three-way valve 170 with the valve 170 having an outlet connected by a line 171 to one end of the pressure regulating valve 162.

A second line 175 connects to the line 165 and extends to the pilot of the three-way valve 170 to provide pressure air for the pilot operation. The line 175 has a manually operated three-way toggle valve 176 and a manually operated two-way spring return valve 177 connected therein.

The outlet side of the pressure regulating valve 162 is connected by a line 178 to the cylinder at the bottom thereof for supplying pressure air to the cylinder beneath the piston. This line has a branch line 179 placing the bottom of the cylinder in communication with an end of the pressure regulating valve 162.

The circuit, as shown, is in a pressurized condition for handling a load, with a pressure condition existing in the lower end of the cylinder 150. This pressure condition exists because the lower side of the cylinder is connected to the supply line 160 through the line 163, the passage 180 in the regulating valve 162 and the line 178. The pressure is determined by the setting of the pressure valve 167 which supplies fluid through the valve 170 to the underside of the valve spool of the valve 162 as shown in FIGURE 11 and urges the valve to open position. When the desired pressure condition in the cylinder is reached, the balancing pressure branch line 179 acts upon the opposite end of the spool valve 162 to obtain the balanced condition. In the event that the balancer assembly is raised with the result that the piston 151 moves up in the cylinder, the pressure in line 178 decreases. The pressure acting through the valve 170 becomes greater and shifts the valve 162 to supply additional pressure to the underside of the cylinder. To change the circuit from the load condition, the toggle valve 176 is manually moved from the position illustrated and the safety circuit, including the spring return valve 177 is also shifted, with the result that the pilot air is removed from the three-way valve 170 by being exhausted to atmosphere through the toggle valve 176. This results in a spring 185 of valve 170 shifting this valve to disconnect the air supply to the lower end of the regulating valve 162, with the result that pressure existing in the cylinder causes the valve 162 to shift and the fluid discharges through an adjustable needle valve 186.

When the force is again to be established by the activation of the system, the toggle valve 176 is shifted to the position shown in FIGURE 11 and the spring return valve 177 is momentarily pushed to supply air to the pilot of the three-way valve 170. This establishes the circuit through lines 166 and 169 to the pressure regulating valve 162 and the pressure builds up within the lower end of the cylinder until a balance in pressure is obtained on opposite ends of the spool in valve 162. The shift of the valve 177 need only be momentary, since when it returns it will trap air in the line to the pilot of valve 170. Also, the valve 177 is ineffective to change the condition of the circuit unless the toggle valve has previously been shifted.

In order to permit free movement of the piston 151, a vent in the form of an exhaust muffler 190 is connected to the upper end of the cylinder. To control the rate of applying pressure to the cylinder, an adjustable needle valve 191 is in line 163. The rate of exhausting the pressure from the cylinder is controlled by the adjustable needle valve 186, previously referred to.

The system is capable of operating either as a pneumatic or hydraulic system. In either system, the cylinder size can be selected in accordance with the pressure available. With the structures disclosed herein designed to handle a load of approximately 125 pounds and with a suitably-sized cylinder, an air supply pressure of 90 p.s.i. is adequate.

A second form of control circuit for the force supplying piston and cylinder is shown in FIGURE 12. In this figure those parts corresponding to those shown in FIGURE 11 have been given the same reference numeral including the cylinder 150 having the piston 151 and rod 152 which, as pointed out previously, is typical of the cylinder construction in all the earlier forms of the invention.

The circuit shown in FIGURE 12 is basically the same as that shown in FIGURE 11 except for the simplification in requiring a lesser number of parts. In this circuit a toggle valve 200 replaces the valves 170, 176 and 177 of the circuit shown in FIGURE 11. An air pressure regulator 201 connects to the line 165 with an outlet line 202 extending to the valve 200. An outlet line 203 from the valve 200 connects to the line 171 leading to the pilot section 231. As shown in FIGURE 12, the circuit components are positioned in the loaded mode of operation. In this mode air under pressure passes through the valve 200 and specifically passage 204 thereof to the lower pilot section 231 of the valve 162 to control the valve in balance with the upper pilot section connected to the line 179. When the circuit is to shift to an unloaded condition, the toggle valve 200 is shifted and line 203 then is exhausted through valve passage 205 with the result that the valve 162 shifts downwardly to exhaust the lower side of the cylinder 150. The loaded condition can again be created by shifting the toggle valve 200 back to the position shown in FIGURE 12.

Figure 13:
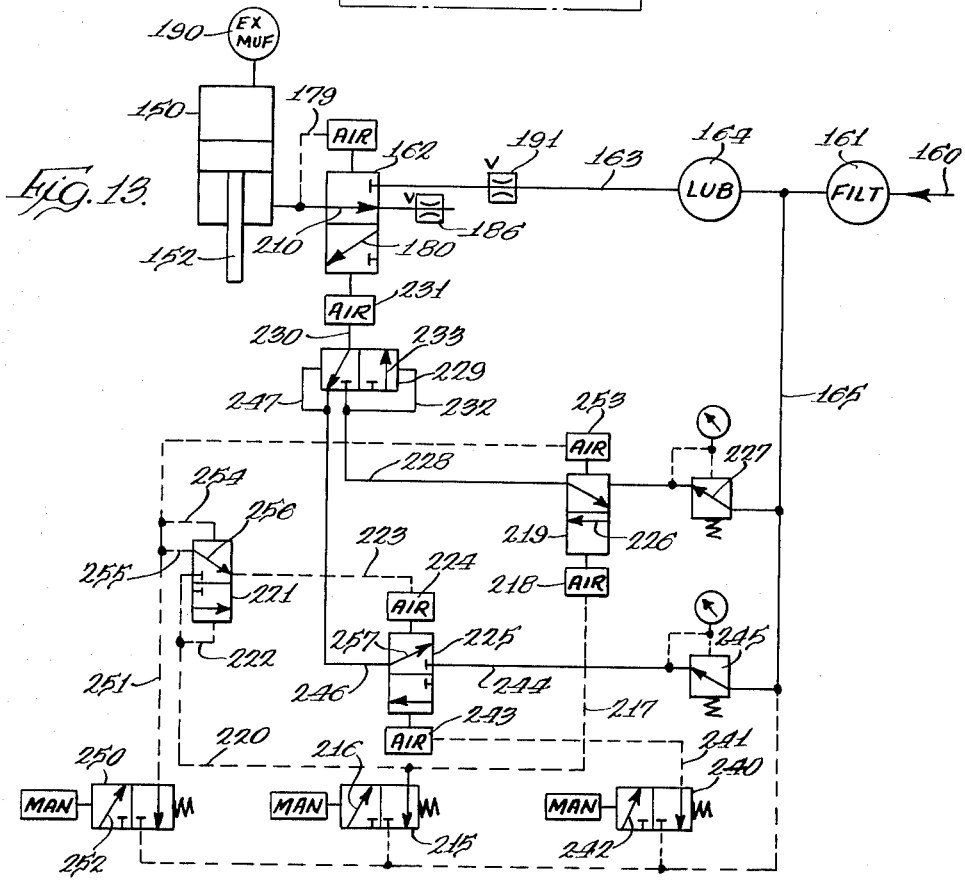
FIGURE 13 is a schematic of a circuit for obtaining a plurality of different load and no-load settings.

A variation in the control circuit is shown in FIGURE 13 in which there are three different modes of operation under manual control as disclosed therein. The circuit is shown in a no-load mode of operation. In this circuit, the balancer can operate either unloaded or for alternately balancing any two parts of differing weight. An example of this would be a repetitive operation involving the loading and unloading of a lathe where stock removal during machining produced an appreciable difference in the weight of the piece. Pushbutton control is disclosed and provides rapid cycling, but other methods of changing the mode of operation could be used. With the circuit as shown in unloaded condition, a valve passage 210 in the balancing valve 162 exhausts the cylinder 150 through the flow restricting needle valve 186. In the event the intermediate load mode of operation is to be established, a selector valve 215 is manually shifted momentarily against the action of the associated spring whereby pressure from the line 165 passes through the valve passage 216 and to a line 217 leading to a first pilot section 218 of an intermediate load control valve 219. Air under pressure also passes through line 220 branching from line 217 to a release valve 221 and to an end thereof through line 222. The release valve 221 functions to release the heavy load control through a line 223 passing to a pilot section 224 of a heavy load control valve 225. The control valves 218 and 225 as well as release valve 221 are designed to remain where shifted until pressure exerted against an end thereof shifts a valve to its other position. The valve 219 having been shifted by pressure applied to pilot section 218 connects valve passage 226 to a source of regulated pressure as established by regulator 227 connected to line 165 with this regulated fluid pressure passing through a line 228 to a shuttle valve 229 having an outlet line 230 connected to the pilot section 231 of the valve 162. This pressure fluid also passes to the end of the shuttle valve through a line 232 to shift the valve and position a passage 233 therein to apply pressure air directly to the pilot section 231 and shift the control valve 162 upwardly as shown in FIGURE 13 whereby air from line 160 is directed to the lower side of the cylinder 150. As described in connection with FIGURE 11, the control valve 162 maintains a constant pressure in the cylinder during continued operation.

The circuit can be shifted from the intermediate load operation to either no-load or heavy load operation. The heavy load operation is established by momentarily shifting a heavy load selection valve 240 to connect a line 241 to line pressure through valve passage 242 which directs air to a pilot section 243 of the heavy load control valve 225 to place a line 244 leading from a pressure regulating valve 245 to a line 246 leading to the shuttle valve 229. A branch line 247 functions to shift the shuttle valve to the position shown in FIGURE 13 whereby air under pressure is supplied to the pilot section 231 of the valve 162. In the heavy load mode of operation there is no shift of the release valve 221 or the control valve 219 used in the intermediate load operation.

When shifting from either the intermediate load or heavy load operation, a selection valve 250 is momentarily actuated to connect line pressure to a line 251 through a valve passage 252. This line pressure passes to a pilot section 253 of the intermediate load control valve 219 to shift the latter valve to a position to block off the pressure regulator 227 and thus take out the intermediate load pressure source.

The line 251 also supplies lines 254 and 255 connected to the release valve 221 to position the valve to have a passage 256 connect to the line 223 leading to the pilot section 224 of the heavy load control valve 225 and shift the valve so that line 246 exhausts to atmosphere through a valve passage 257 so that the pressure regulator 245 for the heavy load operation is not in the circuit.

Each of the selection valves 215, 240 and 250 need only be momentarily shifted and are then returned by spring action with the valves connecting the lines to exhaust except when momentarily shifted. This action can be properly used since the release valve 221 and the control valves 219 and 225 remain in the position to which they are shifted until a pilot section acts to shift the valve in a different direction.

From the foregoing it will be seen that a control circuit is provided wherein the balancer can be set to balance an intermediate load and automatically shifted to balance a heavy load or, alternatively, can be shifted from heavy load to intermediate load or no-load operation. The shift from heavy load to intermediate load is obtained by line pressure passing through passage 216 of valve 215 and then through release valve 221 to the pilot section 224 of the valve 225 to shift this valve to a position to block pressure regulator 245 from the circuit.

Figure 14:
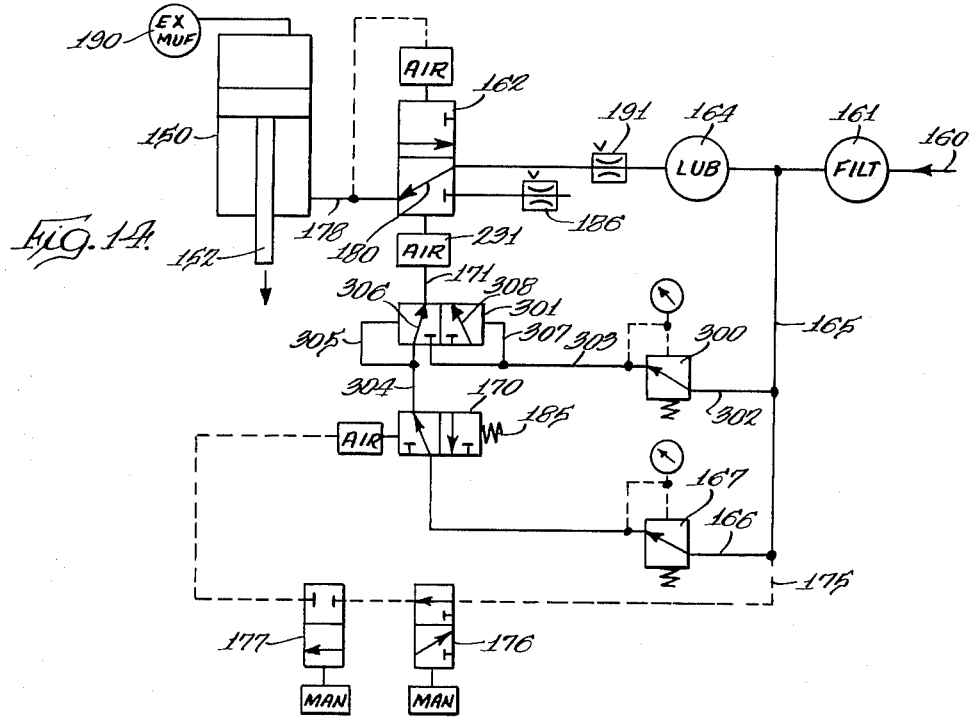
FIGURE 14 is a schematic of a circuit for obtaining a plurality of different load settings.

The circuit shown in FIGURE 14 is generally similar to that shown in FIGURE 11, but includes provision for balance of either a part handling fixture and a part or the handling fixture only. This circuit is substantially the same as that shown in FIGURE 11 except for the addition of a pressure regulator 300 and a shuttle valve 301. The pressure regulator 300 is connected by a line 302 to the supply line 165 and by an outlet line 303 to the shuttle valve 301. The shuttle valve 301 is provided to have air under pressure travel to the pilot section 231 of the valve 162 from either the pressure regulator 167 for establishing a force when the balancer is loaded or from the regulator 300 when a lesser weight, such as the fixture only, is to be balanced. For this purpose, the shuttle valve 301 has a line 304 extending from the valve 170 and a branch line 305 whereby pressure from valve 170 shifts the shuttle valve to the position shown in FIGURE 14 with air under pressure passing through passage 305 to the pilot section 231. When the circuit is shifted to the "no-load" condition by operation of valves 176 and 177 as described in connection with FIGURE 11, then the pressure regulator 300 takes over, and air under pressure passes through line 303 and line 307 to shift the shuttle valve to the left and place valve passage 308 in communication with the line 171 leading to the pilot section 231. In this condition the work holding fixture is balanced by the pressure set on regulator 300. When the circuit is again to shift to the full load operation, the valves 176 and 177 are operated to again shift shuttle valve 301 to the right-hand position. If the load balancing apparatus is to operate without a fixture then the regulator 300 can be adjusted to zero pressure so that it in effect is no longer in the circuit.

Figure 15:
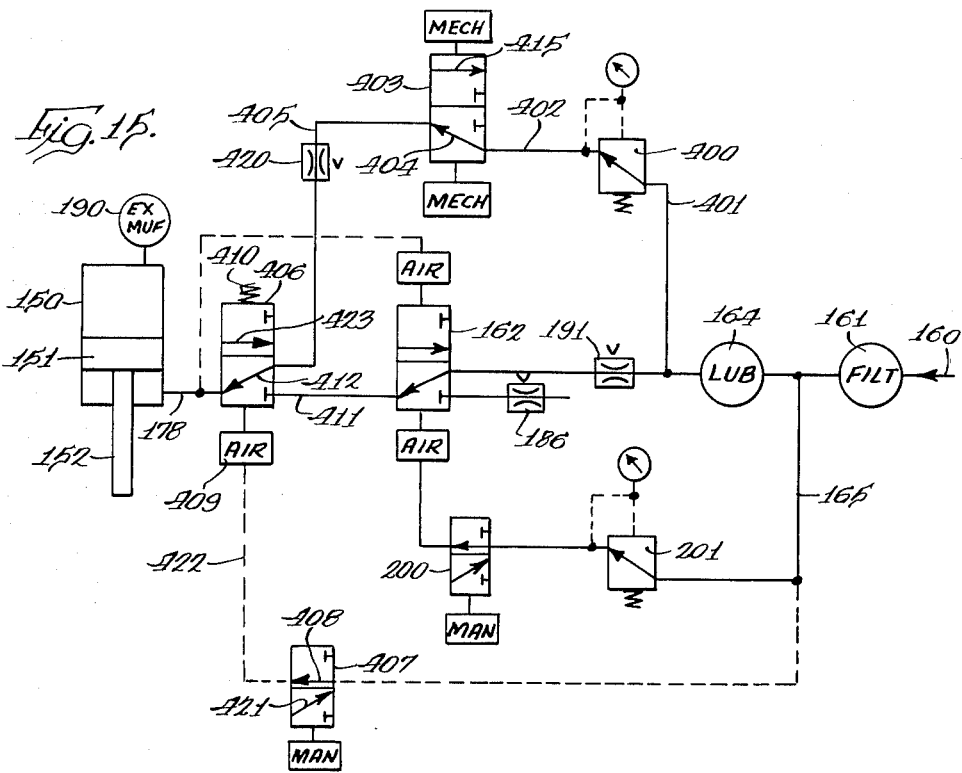
FIGURE 15 is a schematic of a circuit for obtaining automatic cycling of the load balancer.

An automatic cycling circuit is disclosed in FIGURE 15 in which added circuit components have been associated with the basic balancer circuit shown in FIGURE 12. The vertical cycling is obtained by means of a pressure regulator 400 connected by a line 401 to the main line 160 and set at a higher pressure than the regulator 201 which provides for normal balance of the balancer. The output of the regulator 400 is connected to a line 402 leading to a mechanically actuated valve 403 having in one position a passage 404 which connects to a line 405 leading to a control valve 406. The circuit is shown conditioned to provide vertical cycling in which a cycle control valve 407 which can be manually operated has a passage 408 connecting line pressure to a pilot section 409 of the valve 406 to shift the valve 406 to the position shown against the action of a spring 410. With the valve 406 positioned as shown, the normal balancer circuit acting through line 411 is inoperative. The line 405 of the cycling control directs fluid pressure through passage 412 of the valve 406 to the line 178 leading to the lower side of the cylinder. With the pressure supplied to the cylinder greater than that needed to balance the load being handled, the piston 151 rises in the cylinder until the valve 403 is mechanically shifted to place a passage 415 in the valve 403 in communication with the line 405 with the result that pressure can bleed from the cylinder until the piston 151 descends to a position to again mechanically shift the valve 403. When the valve 403 again shifts, the passage 404 connects lies 402 and 405 to direct pressure to the lower side of the cylinder and the cycle repeats to obtain repeated vertical cycling. The cycling speed is controlled by an adjustable restriction in the form of a needle valve 420 in the line 405 which controls the fluid flow in both directions through the line 405.

When automatic cycling is to be discontinued, the valve 407 is manually shifted to cause a passage 421 therein to bleed the line 422 leading to the pilot section 409 with the result that the spring 410 shifts the valve 406 to place a passage 423 thereof in communication with the line 178 leading from the cylinder and the line 411 leading to the normal control valve 162. When this is accomplished then normal load balancing can be obtained with the force being determined by the pressure set on regulator 201.

What is claimed is:

1. A hoisting balancer assembly comprising a hanger having a base member and a pair of spaced generally vertical arms connected thereto; a generally horizontal first arm pivotally mounted between said arms for rotation about a horizontal axis; a generally vertical second arm adapted to receive a load to be hoisted and balanced by said assembly, said second arm being pivotally connected to one end of said first arm; a third arm pivotally connected to said second arm; and a fourth arm pivotally connected at one end to the other end of said first arm and at its other end to said third arm, said arms between said pivotal connections forming a parallelogram; a counterweight operatively connected to one of said arms; and means for applying a generally vertical force to said third arm, said means comprising a fluid-actuated piston, a cylinder in which said piston is reciprocable, said cylinder being attached to said hanger by means which permits said piston to exert a force in a vertical direction regardless of the position of said first arm, the upper end of said cylinder being free to move horizontally as required to maintain the cylinder with its axis in a vertical position.

2. A hoisting balancer assembly comprising a hanger having a base member and a pair of spaced generally vertical arms connected thereto; a generally horizontal first arm pivotally mounted between said arms for rotation about a horizontal axis; a generally vertical second arm adapted to receive a load to be hoisted and balanced by said assembly, said second arm being pivotally connected to one end of said first arm; a third arm pivotally connected to said second arm; and a fourth arm pivotally connected at one end to the other end of said first arm and at its other end to said third arm, said arms between said pivotal connections forming a parallelogram; a counterweight operatively connected to one of said arms; and means for applying a generally vertical force to said third arm, said means comprising a fluid-actuated piston, a cylinder in which said piston is reciprocable, said cylinder being attached to said hanger by means which permits said piston to exert a force in a vertical direction regardless of the position of said first arm, said cylinder being fixed in a vertical position, the piston being attached to said third arm by means permitting relative horizontal movement therebetween.

3. A hoisting balancer assembly comprising a generally horizontal first arm mounted for pivotal movement about a horizontal axis; a generally vertical second arm adapted to receive a load to be hoisted and balanced by said assembly, said second arm being pivotally connected to said first arm; a generally horizontal third arm pivotally connected to said second arm; a generally vertical fourth arm pivotally connected to said third arm and to said first arm, the spacing between said pivotal connections among said arms being such as to form a parallelogram with said first arm and said third arm being parallel and said second arm and said fourth arm being parallel; a counterweight attached to one of said arms; means for applying a substantially vertical force to one of said horizontal arms at a point intermediate its ends; and means for maintaining said force constant in all positions of said assembly.

4. The balancer assembly of claim 3 in which said force applying means comprises a cylinder and a fluid-actuated piston and said maintaining means comprises a fluid circuit maintaining a pre-set pressure constant in said cylinder acting on said piston as the piston position varies.

5. A hoisting balancer assembly comprising a base member and a pair of spaced generally vertical arms connected thereto; a generally horizontal first arm pivotally mounted between said arms for rotation about a horizontal axis; a generally vertical second arm adapted to receive a load to be hoisted and balanced by said assembly, said second arm being pivotally connected to one end of said first arm; a third arm pivotally connected to said second arm; and a fourth arm pivotally connected at one end to the other end of said first arm and at its other end to said third arm, said arms between said pivotal connections forming a parallelogram; and means for applying a generally vertical force to said third arm, said means comprising a fluid-actuated piston, a cylinder in which said piston is reciprocable, and a pressure regulating circuit connected to said cylinder to maintain a constant pressure on the piston in all positions of said assembly.

6. A hoisting balancer assembly comprising a generally horizontal first arm mounted for pivotal movement about a horizontal axis; a generally vertical second arm adapted to receive a load to be hoisted and balanced by said assembly, said second arm being pivotally connected to said first arm; a piston and cylinder with the piston operatively associated with said first arm for applying an elevating force to said arms; circuit means for supplying fluid at a predetermined pressure to said cylinder to act on said piston and provide a predetermined amount of elevating force; and means in said circuit for maintaining said pressure constant in the cylinder as the piston position varies with the movement of said arms.

7. An assembly as defined in claim 6 in which said circuit further includes means to control the rate of fluid flow to and from said cylinder to thereby control the rate of application and removal of elevating force to said arms.

8. An assembly as defined in claim 6 including an auxiliary valve in said circuit in series with said means for maintaining the pressure constant which must be actuated prior to supplying of fluid to said cylinder, said valve being ineffective to change the condition of the circuit once the circuit condition is established.

9. In a load balancer, a frame, a load support arm movably mounted on said frame, a power cylinder having a piston movably connected to said arm to act against a load connected to said arm, means connectable to a source of fluid under pressure for applying fluid to said cylinder, and a control circuit interposed between said means and said cylinder, said control circuit including a pilot operated valve for directing fluid to and from said cylinder, said valve being responsive to a control fluid pressure and cylinder fluid pressure whereby an imbalance in said fluid pressures causes said valve to restore a balance in said pressures.

10. In a load balancer as defined in claim 9, means providing two different control pressures to provide balancing for two different weights, and means for selecting which of said control pressures shall be operative.

11. In a load balancer as defined in claim 10, means for rendering said control pressure providing means inactive whereby no control pressure is supplied to said pilot operated valve.

12. In a load balancer as defined in claim 9, a cycling control for said cylinder including a second valve responsive to the position of said piston for controlling the application or release of fluid pressure to said cylinder, a third valve connected between said cylinder and the pilot operated valve for deactivating said pilot operated valve and placing said second valve in fluid communication with said cylinder, and means for operating said third valve.

13. In a load balancer, a frame, a load support arm movably mounted on said frame, a power cylinder having a piston movably connected to said arm, means connectable to a source of fluid under pressure for applying fluid to said cylinder, and a control circuit interposed between said means and said cylinder, said control circuit including a pilot operated valve for directing fluid to and from said cylinder, said valve having opposed pilot sections with one pilot being in fluid communication with said cylinder, and a source of control pressure connected to the other of said pilot sections whereby said valve operates in response to said pilot sections to maintain the cylinder pressure the same as the control pressure.

14. In a load balancer as defined in claim 13, a second valve for controlling the application of control pressure to said pilot section, and a pair of flow restrictors connected to said pilot operated valve to control the rate of application to and the rate of withdrawal of fluid pressure relative to said pilot operated valve and thereby the rate of force application and removal to said load support arm.

15. A load balancer as defined in claim 13, including two distinct sources of control pressure selectively connectable to the other of said pilot sections, means including a first selection valve for connecting one source of control pressure, means including a second selection valve for connecting the other source of control pressure, and means including a third selection valve for disconnecting both of said sources of control pressure.

References Cited by the Examiner

UNITED STATES PATENTS

| | | | |
|---|---|---|---|
| 1,430,714 | 10/1922 | Wyatt | 214—130 |
| 1,843,968 | 2/1932 | Bellows | 254—10 |

HUGO O. SCHULZ, *Primary Examiner.*